(12) United States Patent
Kulkarni et al.

(10) Patent No.: US 8,457,842 B2
(45) Date of Patent: Jun. 4, 2013

(54) MAGNETIC ASSISTED POWER STEERING SYSTEM

(75) Inventors: Girish Suchir Kulkarni, Maharashtra (IN); Akshay Balkrishna Agarkar, Maharashtra (IN)

(73) Assignee: Eaton Corporation, Cleveland, OH (US)

( * ) Notice: Subject to any disclaimer, the term of this patent is extended or adjusted under 35 U.S.C. 154(b) by 552 days.

(21) Appl. No.: 12/643,564

(22) Filed: Dec. 21, 2009

(65) Prior Publication Data
US 2011/0153159 A1 Jun. 23, 2011

(51) Int. Cl.
*A01B 69/00* (2006.01)
(52) U.S. Cl.
USPC ............. 701/41; 180/400; 180/421; 280/5.51
(58) Field of Classification Search
USPC ....... 701/41, 42; 180/400, 421, 444; 280/5.51
See application file for complete search history.

(56) References Cited

U.S. PATENT DOCUMENTS

| 4,621,327 | A | 11/1986 | Dolph et al. |
| 4,813,294 | A * | 3/1989 | Ukai et al. ................. 74/388 PS |
| 4,828,067 | A | 5/1989 | Duffy |
| 6,161,644 | A | 12/2000 | Kim |
| 7,469,768 | B2 | 12/2008 | Chino et al. |
| 2003/0201137 | A1 * | 10/2003 | Crapo et al. .................. 180/444 |
| 2007/0107974 | A1 | 5/2007 | Ueno |

* cited by examiner

*Primary Examiner* — Gertrude Arthur Jeanglaude
(74) *Attorney, Agent, or Firm* — Dykema Gossett PLLC

(57) ABSTRACT

A power steering system for a motor vehicle includes a rack and pinion assembly in which the teeth of the pinion are engaged with the teeth of the rack. The power steering system further includes magnets (e.g., permanent magnets or electromagnets) connected to the rack, as well as magnets (e.g., permanent magnets or electromagnets) connected to a rack tube. A varying maglev (i.e., magnetic levitation) force obtained by controlling current flowing through at least some of the magnets (e.g., by varying duty cycle of pulse-width-modulation through an electronic control unit) provides steering assistance for the motor vehicle employing the power steering system. A power steering system includes first and second steering elements, magnets connected to the steering elements, and a controller configured to obtain speed information and steering position information and to control the activation of the magnets in response to the speed information and steering position information.

23 Claims, 5 Drawing Sheets

MAGNETIC ASSISTED POWER STEERING SYSTEM

TECHNICAL FIELD

The present invention relates to a magnetic and/or levitation assisted power steering system, including a steering system assisted by manipulation of a magnetic field present in the steering system (e.g., rack and pinion arrangement) for a motor vehicle (e.g., four-wheel drive vehicle).

BACKGROUND

Power steering systems are generally designed to reduce the steering effort on motor vehicles by using an external power source to assist in turning the wheels of a motor vehicle. There are two major types of power steering systems, namely, hydraulic power steering systems and electro hydraulic power steering systems. In the first major type of system, a hydraulic system is used to turn the wheels of the motor vehicle, and the hydraulic pressure is generally provided by a rotary vane pump driven by the engine of the motor vehicle. In the second major type of system, a hydraulic system is again used to turn the wheels of the motor vehicle, but the hydraulic pressure is generally provided by a pump (e.g., rotary vane pump) driven by an electric motor (i.e., instead of by the engine). Hydraulic power steering systems and electro hydraulic power steering systems may tend to exhibit different behavior at different engine speeds since the hydraulic oil pump delivery to the hydraulic system depends on engine RPM. Furthermore, these existing hydraulic power steering systems tend to consume about 5-10% of the power produced by the engine.

While hydraulic power steering systems and electro hydraulic power steering systems are commercially acceptable, such systems may have additional drawbacks. For example, such systems may be relatively bulky and may comprise a complex design. This may undesirably increase cost due to the design complexity. It may be desirable to utilize a magnetic assisted power steering system that may reduce the cost, decrease bulk, and improve reliability of power steering over the present power steering systems that are commercially available. For example, a magnetic assisted power steering system in accordance with the present invention may allow for elimination of a hydraulic pump, belt pulley, and/or electric motor arrangement present in other power steering systems that can cause losses for a diesel or petrol driven vehicle. A magnetic assisted power steering system may also be advantageous because it may not consume power developed by the engine. In addition, its efficiency may be relatively constant even under all engine conditions (e.g., idle and/or full acceleration). This results in improved engine efficiency and reduced fuel consumption. A magnetic assisted power steering system in accordance with the present invention may be suitable for hybrid and fuel cell vehicles and/or may be fitted onto a regular series of automobile products. A magnetic assisted power steering system in accordance with the present invention may also allow modification to and from power steering modes and mechanical steering modes. A magnetic assisted power steering system in accordance with the present invention may also comprise a fail-safe steering assisting mechanism because in the case of any failure of the magnetic levitation, the steering system may still be in working condition based on the existing mechanical system.

SUMMARY

A power steering system for a motor vehicle may include a steering shaft; a pinion shaft connected to the steering shaft; and a pinion located on the pinion shaft. The pinion may have at least one pinion tooth. The steering system may further include a rack and a rack housing. The rack may have at least one rack tooth configured to be in engagement with the pinion tooth. The power steering system may further include a first magnet connected to the rack and a second magnet connected to the rack housing or rack tube.

A method for providing steering assist in a power steering system of a motor vehicle includes the following steps: sensing steering position information (e.g., from a steering sensor connected to the power steering system); sensing vehicle speed information (e.g., through the vehicle CAN-bus and/or a speed sensor connected to the power steering system); controlling activation of least one magnet connected to the power steering system based at least in part on the steering position information or vehicle speed information or a combination thereof; assigning a polarity of the least one magnet connected to the power steering system; and generating a magnetic guidance force in the direction of steering. In an embodiment, the steering position information may be obtained with the assistance of a sensor (e.g., toothed wheel) that may be installed on a steering shaft of the steering system.

An assembly for a power steering system for a motor vehicle may include a rack, a rack housing surrounding the rack, a first magnet connected to the rack, and a second magnet connected to the rack housing.

A power steering system for a motor vehicle may include a first steering element, a first magnet connected to the first steering element, a second steering element, and a second magnet connected to the second steering element. The power steering system may further include a controller configured to obtain motor vehicle speed information and steering position information and to control the activation of the first magnet or second magnet in response to the motor vehicle speed information and the steering position information.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1A:
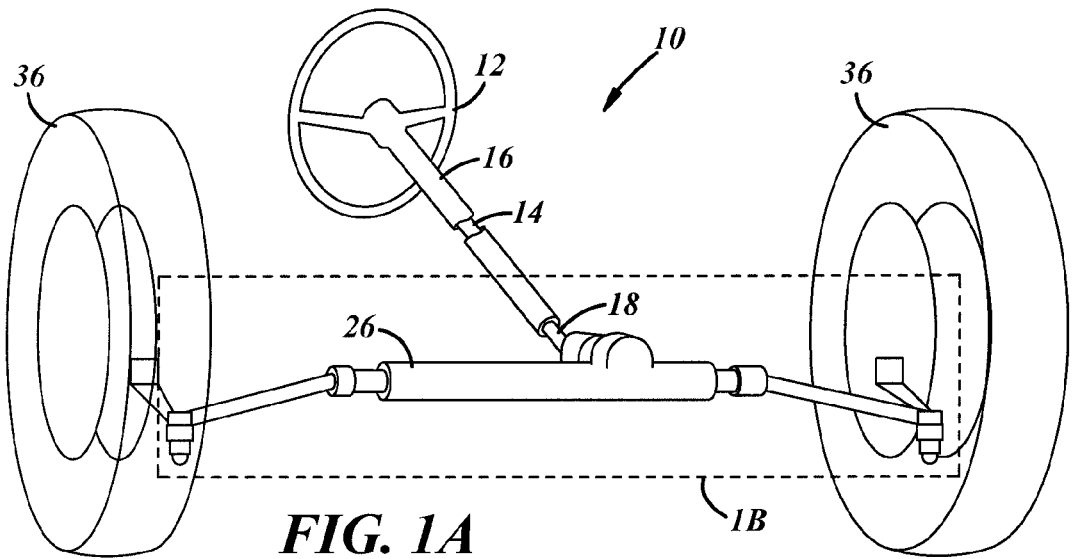
FIG. 1A is a schematic view of a steering system in accordance with an embodiment of the invention.
Figure 1B:
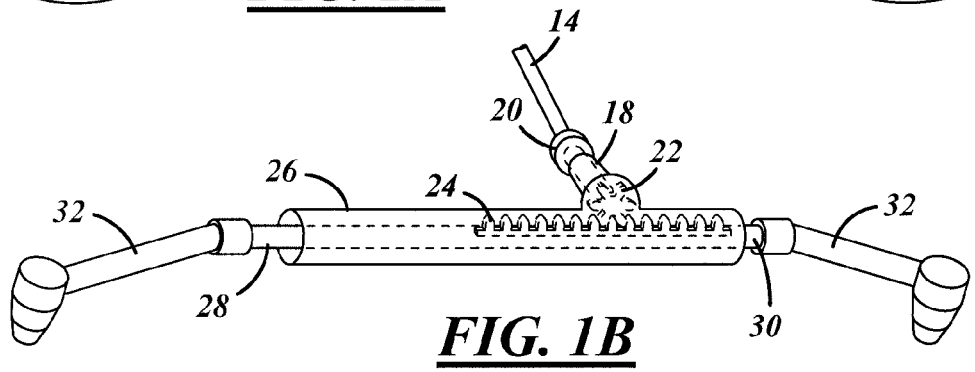
FIG. 1B is a partial enlarged view of the schematic view of FIG. 1.

Referring now to FIG. 1A, a schematic view of the steering system 10 is illustrated. The steering system 10 may include a steering member 12, such as a steering wheel. The steering member 12 may be connected (e.g., coupled) to a steering shaft 14. A steering column 16 may be configured for rotatably supporting the steering shaft 14 therein. Rack and pinion steering is generally the most common type of steering on motor vehicles (e.g., cars, small trucks, and SUVs). However, other types of steering systems comprising any number of various steering elements may be utilized in the inventive steering system. If rack and pinion steering is utilized in the inventive steering system, the steering system 10 may further include a pinion shaft 18. As best shown in FIG. 1B, pinion shaft 18 may be coupled to the steering shaft 14 via a universal joint 20 at a first end of the pinion shaft 18. The second opposing end of the pinion shaft 18 may include a pinion gear 22. Pinion gear 22 may have a plurality of pinion teeth in accordance with an embodiment of the invention. The steering system may further include a rack 24. Rack 24 may comprise a steerable shaft extending transversely relative to the longitudinal axis of a motor vehicle employing the steering system 10. Rack 24 may have a plurality of rack teeth in accordance with an embodiment of the invention. The rack teeth may be configured for meshed engagement with the pinion teeth provided on the pinion gear 22. In an embodiment, the steering shaft 14 may comprise an input shaft connected to the steering member 12 (e.g., steering wheel) and an output shaft connected to the pinion shaft 18. The input shaft and output shaft may be coaxially coupled to each other via universal joint 20. The input shaft and output shaft are connected to be rotatable relative to each other.

Figure 2:
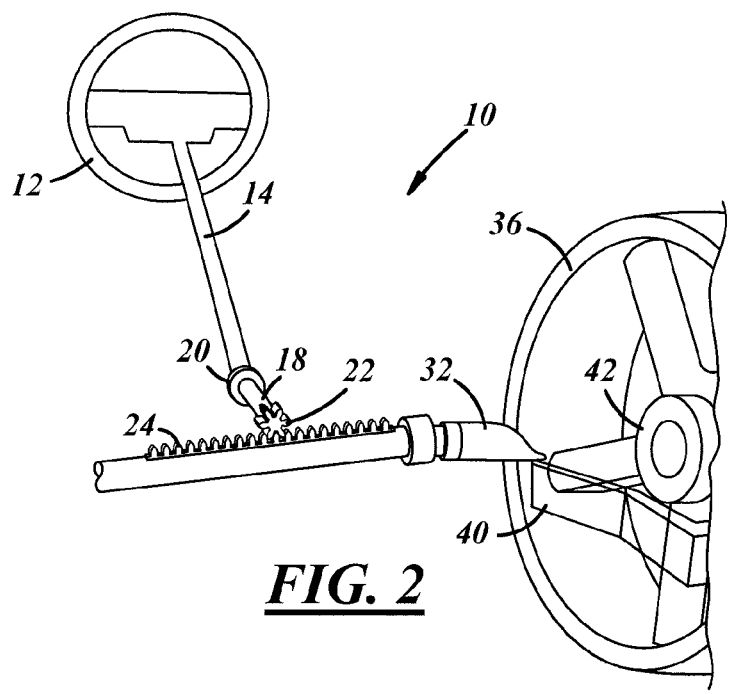
FIG. 2 is another schematic view of a steering system in accordance with an embodiment of the invention.

Referring again to FIGS. 1A-1B, the rack 24 may be disposed in a housing 26 (e.g., fixed tube casing or rack tube). Housing or rack tube 26 may be configured to be connected to a vehicle body via clamps in accordance with an embodiment of the invention. The housing or rack tube 26 may be configured to allow for movement of the rack 24 within housing or rack tube 26. For example, rack 24 may move in a linear manner along an axis extending transversely relative to the longitudinal axis of the motor vehicle employing the steering system 10. First and second ends 28, 30 of rack 24 may project laterally outwardly of the housing 26. First and second ends 28, 30 of rack 24 may be connected to tie rods 32. Tie rods 32 may be connected to corresponding vehicle wheels 36. Referring now to FIG. 2, tie rods 32 may be connected to corresponding vehicle wheels 36 via corresponding steering arms 40 (e.g., knuckle arms) and associated wheel spindle 42. When the steering member 12 (e.g., steering wheel) is operated to rotate the steering shaft 14, the rotation of the steering shaft 14 may be converted into linear movement of the rack 24 and steering of the motor vehicle (i.e., wheels 36) may be achieved.

Figure 3B:
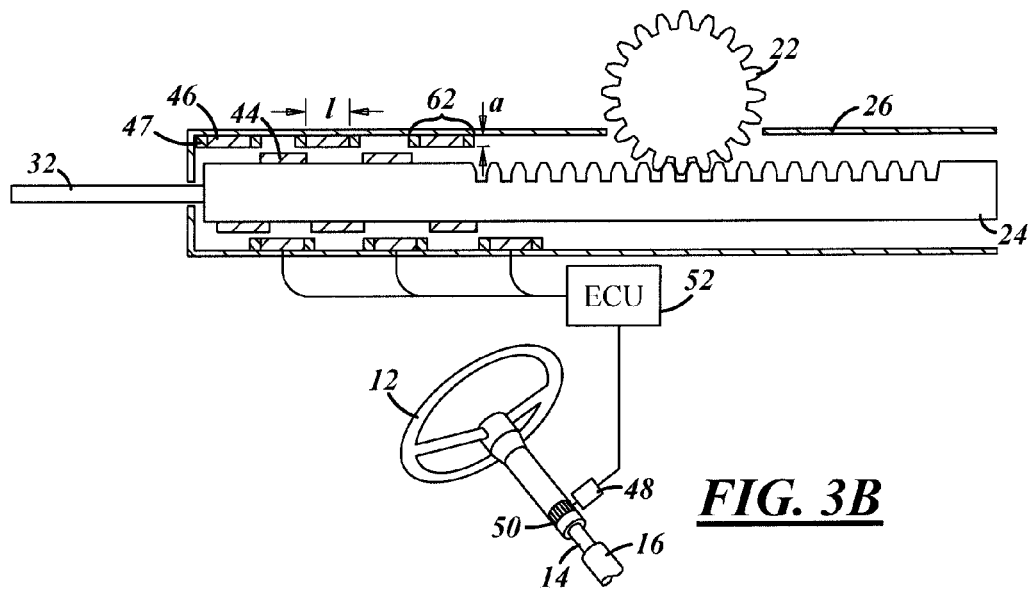
FIG. 3B is a sectional view of a portion of the steering system of FIG. 3A, including additional elements of the steering system in accordance with an embodiment of the invention.
Figure 3C:
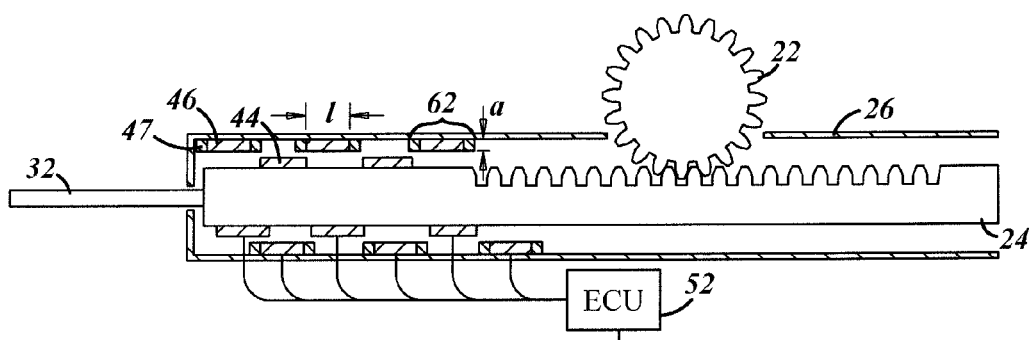
FIG. 3C is a sectional view of a portion of the steering system of FIG. 3A, including additional elements of the steering system in accordance with an embodiment of the invention.
Figure 3A:
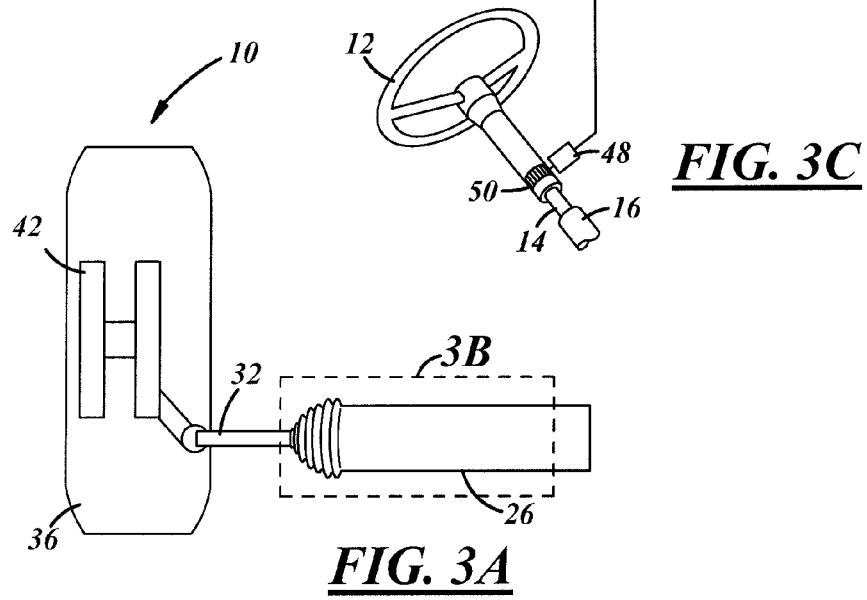
FIG. 3A is schematic view of a magnetic assisted power steering system in accordance with an embodiment of the invention.

Referring now to FIGS. 3A-3B, a schematic view of a steering system 10 in accordance with an embodiment of the invention, including a sectional view of a portion of the steering system 10, is illustrated. In particular, a sectional view of the housing or rack tube 26 is illustrated. The system 10 may be configured to utilize the principle of maglev (i.e., magnetic levitation or magnetic suspension), including for example and without limitation, guidance force, levitation force, and/or attractive and repulsive force of magnets 44, 46. Magnets 44, 46 may provide magnetic guidance assistance to the steering system 10 while steering the motor vehicle in which the system 10 is employed. In particular, a first magnet or plurality of magnets 44 may be connected to (e.g., fitted onto) the rack and pinion assembly (or other steering element assembly) of the steering system 10. The first magnet 44 may be fitted onto an outer surface of the rack 24 in an embodiment. The first magnet 44 may be connected to the rack 24 with the use of screws (not shown) or by any other means. Although this method of connection is mentioned in detail, the first magnet 44 may be connected to the rack 24 by any known and/or conventional method and/or manner known to those of skill in the art. The first magnet 44 may be directly connected (i.e., without any intervening structural elements) to the rack 24 in an embodiment of the invention. The first magnet 44 may comprise a permanent magnet in accordance with an embodiment of the invention. The first magnet 44 may comprise an electromagnet in accordance with an embodiment of the invention. For example and without limitation, the first magnet 44 may comprise a neodymium magnetic material in accordance with an embodiment of the invention. The first magnet 44 may be configured to have N-polarity and/or S-polarity.

A second magnet or magnets 46 may be connected to (e.g., fitted onto) the rack and pinion assembly (or other steering element assembly) of the steering system 10. The second magnet 46 may be fitted onto an inner surface of housing or rack tube 26 in an embodiment. The second magnet 46 may be connected to the housing 26 with the use of screws (not shown) or by any other means. Although this method of connection is mentioned in detail, the second magnet 46 may be connected to the housing 26 by any known and/or conventional method and/or manner known to those of skill in the art. The second magnet 46 may be directly connected (i.e., without any intervening structural elements) to the housing 26 in an embodiment of the invention. The second magnet 46 may comprise an electromagnet in accordance with an embodiment of the invention. The second magnet 46 may comprise a permanent magnet in accordance with an embodiment of the invention. For example and without limitation, the second magnet 46 may comprise an electromagnetic (e.g., ferromagnetic) material in accordance with an embodiment of the invention.

The current flowing through the second magnet 46 (and/or first magnet 44) may vary in order to change the guidance force assisting the system 10. In accordance with one embodiment of the invention, current flowing (e.g., by varying pulse-width-modulation (PWM) duty cycle) through the second magnet 46 (and/or first magnet 44) may be controlled through an electronic device (e.g., solenoid). In accordance with this embodiment, the variation in current may be caused by and/or relate to changes in the pulse-width-modulation (PWM) duty cycle. Although the use of pulse width modulation is described in detail to control the second magnet 46 (and/or first magnet 44), there may be various other means to control the second magnet 46 (and/or first magnet 44) and/or adjust the power to the second magnet 46 (and/or first magnet 44) that are known to those of skill in the art.

The polarity between the first and second magnets 44, 46 may be interchanged. The first magnet 44 and/or second magnet 46 may comprise an electromagnet or permanent magnet which may include coil 47 through which current may flow. The first magnet 44 and coil 47 may together comprise an electronic device (e.g., solenoid 62) in accordance with an embodiment of the invention. The second magnet 46 and coil 47 may together comprise an electronic device (e.g., solenoid 62) in accordance with an embodiment of the invention. The current flowing through the first magnet 44 (e.g., solenoid 62) and/or second magnet 46 (e.g., solenoid 62) may generate an electromagnetic and/or guidance force. When rack 24 may move in a linear manner with rotation of steering member (e.g., steering wheel) 12, the first magnets 44 which may be connected to rack 24 may move along with the rack 24. In other embodiments, a first steering element may move with rotation of steering member (e.g., steering wheel) 12 which may cause movement of first magnets 44. This movement of first magnets 44 in turn may cause a change in the lateral position of the second magnets 46 (e.g., located on rack housing 26 or any other second steering element) relative to the first magnets 44. As the lateral distance between the first magnets 44 and second magnets 46 changes, the electromagnetic and/or guidance force that is generated may also change. Accordingly, the guidance force may be modified by varying the current through the first magnet 44 or second magnet 46 (e.g., solenoid 62).

The guidance force may be inversely related to vehicle speed in an embodiment of the invention. For example, the guidance force may vary (e.g., may be relatively high at low vehicle speeds and may be relatively low at high vehicle speeds). At high vehicle speeds, when the guidance force may be relatively low, for example, the current flow (e.g., by controlling duty cycle) through solenoid 62 may be relatively low. When the current flow is relatively low, less current may be drawn from the vehicle battery, which may improve the efficiency of the overall system 10. An electronic control unit (e.g., ECU) 52 as described herein may be used to control the guidance force at different vehicle speeds, so that a driver of a motor vehicle would not necessarily feel the change in power steering assist at different vehicle speeds. There may be various means to control the guidance force at different speeds, including without limitation, pulse width modulation.

Figure 3D:
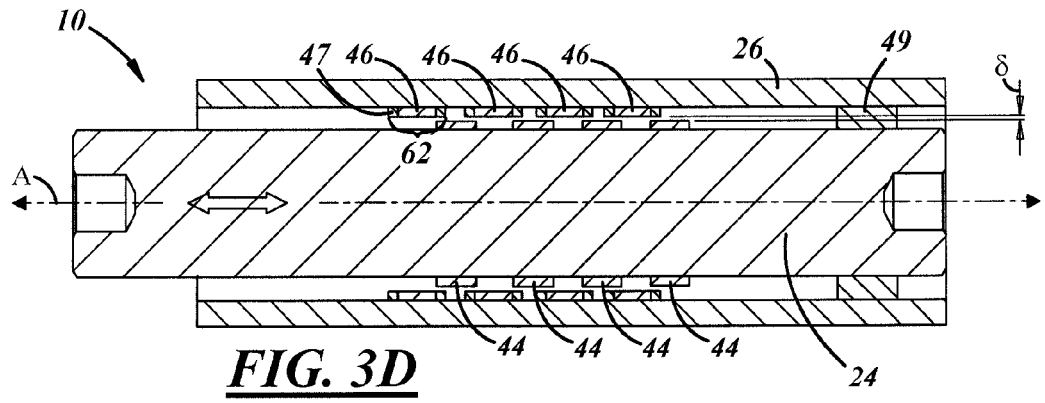
FIGS. 3D-3E are additional sectional views of a portion of the steering system in accordance with embodiments of the invention.

Referring now to FIG. 3D, an embodiment of the inventive steering system 10 is generally illustrated. As illustrated, a plurality or set of first magnets 44 may be connected to rack 24. The first magnets 44 may be equally spaced along the longitudinal axis A of rack 24. The first magnets 44 may not be equally spaced in other embodiments of the invention. As illustrated, a plurality or set of second magnets 46 may be connected to housing or rack tube 26. The second magnets 46 may be equally spaced along the longitudinal axis A or rack 24. The second magnets 46 may not be equally spaced in other embodiments of the invention. The distance between the first magnet 44 and the second magnet 46 may be fixed and/or predetermined. For example, there may be an air gap δ between first magnets 44 and second magnets 46 in the radial direction of the rack 24. Generally, the first magnets 44 and second magnets 46 may be alternating (i.e., the first magnets 44 and second magnets 46 may not directly oppose each other). The steering system 10 may further include bearings and/or slide blocks 49 disposed at opposite ends of rack 24 in an embodiment of the invention. The bearings may comprise, for example, nylon slip bearings in an embodiment. The bearings and/or slide blocks 49 may be connected (i.e., fixed) at both ends of rack 24. Any other means for reducing friction between the rack 24 and rack housing or tube 26 that are known to those of ordinary skill in the art may be utilized in place of bearings and/or slide blocks 49.

Figure 3E:
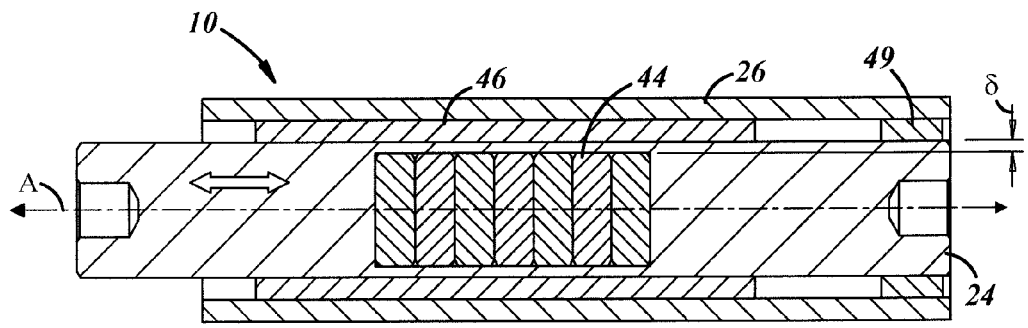

Referring now to FIG. 3E, an embodiment of the inventive steering system 10 is generally illustrated. As illustrated, the first magnet 44 may comprise an integral, monolithic member made up of a plurality of segments. The first magnet 44 may be connected to rack 24. Although a plurality of segments are illustrated, there may be fewer or more segments in other embodiments of the invention. As illustrated, the second magnet 46 may comprise an integral, monolithic member. The second magnet 46 is connected to housing or rack tube 26. The second magnet 46 extends longitudinally along axis A. As in other embodiments, there is an air gap δ between first magnet 44 and second magnet 46 in the radial direction of the rack 24. This arrangement of first magnet 44 and second magnet 46 may provide magnetic levitation and/or magnetic guidance (i.e., "maglev") force. The steering system 10 may further include bearings and/or slide blocks 49 disposed at opposite ends of rack 24 in an embodiment of the invention. The bearings may comprise, for example, nylon slip bearings in an embodiment. The slide blocks 49 may be connected (i.e., fixed) at both ends of rack 24. Any other means for reducing friction between the rack 24 and rack housing or tube 26 that are known to those of ordinary skill in the art may be utilized in place of bearings and/or slide blocks 49.

Referring again to FIG. 3B and to FIG. 3C, additional elements of the steering system 10 in accordance with an embodiment of the invention are shown. The system 10 may further include a steer sensor 48 and sensor 50. Steer sensor 48 may be fitted into steering column 16. For example, a bracket may be used to fit the steer sensor 48 onto steering column 16. Although a bracket is mentioned in detail, any of various means may be used to connect the steer sensor 48 to the steering column 16 that are known by those of ordinary skill in the art. A sensor 50 may be fitted onto steering shaft 26. The sensor 50 may comprise a ring and/or toothed wheel in an embodiment of the invention. The steer sensor 48 may senses fractional changes in steer movement, as well as the direction of rotation of steering member 12 (e.g., clockwise and/or counterclockwise direction). Depending on the clockwise and/or counterclockwise direction of the steering member 12, and the vehicle speed obtained through the vehicle CAN-bus, for example, the ECU 52 may change the current flowing through solenoid 62 and/or second magnet 46 and/or first magnet 44 (e.g., through duty cycle control in an embodiment) in order to generate guidance force in the steering system 10. In an embodiment of the invention, a driver of the motor vehicle would generally feel an equal amount of steering assistance force at any motor vehicle speed. ECU 52 may control the guidance force for the steering system 10 by varying the current (e.g., duty cycle) through solenoid 62. Although duty cycle is mentioned in detail, the ECU may use any of various control means known to those of ordinary skill in the art to control the guidance force for the steering system 10.

Depending upon the speed of the vehicle, the ECU 52 may determine the guidance force to be supplied to the rack and pinion assembly. At very low speeds, the guidance force may be configured to be considerably higher (i.e., stronger) as there may be higher friction between the tire and the road. At higher speeds, the guidance force may be configured to be considerably lower (i.e., weaker). Accordingly, based on vehicle speed and steering direction (e.g., steering wheel movement), the ECU 52 may control the guidance force to provide additional steering force to the rack and pinion assembly. Vehicle speed may be obtained via the vehicle CAN-bus and/or a vehicle speed sensor in some embodiments of the invention.

Still referring to FIGS. 3B-3C, electronic control unit (ECU) 52 is illustrated. The ECU 52 may be a programmable controller that is configured to monitor a number of analog inputs (e.g., speed and/or direction) in determining the guidance force. In an embodiment, the controller may comprise a microcontroller. ECU 52 may also be connected (e.g., mounted) to the steering column 16. ECU 52 may be connected to the steering column 16 with the help of mounting brackets. Although a mounting bracket is mentioned in detail, any of various means may be used to connect the ECU 52 to the steering column 16 that are known by those of ordinary skill in the art. ECU 52 may be connected with steer sensor 48 and solenoid 62 and/or second magnet 46 (and/or first magnet 44). For example, referring to FIG. 3B, the ECU 52 may be connected to second magnets 46 only. For another example, referring to FIG. 3C, the ECU 52 may be connected to first magnets 44 and second magnets 46. In other examples, the ECU 52 may be connected to first magnets 44 only. The ECU 52 may thus be electrically connected to first magnets 44 and/or second magnets 46 in accordance with various embodiments of the invention, as the first magnets 44 and second magnets 46 may comprise electromagnets or permanent magnets or a combination thereof in accordance with various embodiments of the invention. The steer sensor 48 may enable the ECU 52 to sense positional changes in steer movement (e.g., sense fractional change in the steer movement) in the right or left (and/or clockwise or counterclockwise) steer. The ECU 52 may then control the magnetization and/or activation/deactivation of second magnet 46 (and/or first magnet 44). ECU 52 may thus be configured to provide a guidance force by varying current through the second magnet 46 (and/or first magnet 44). The ECU 52 may provide a sophisticated control system for sensing and determining if/when power assist is necessary and/or desirable.

Figure 4:
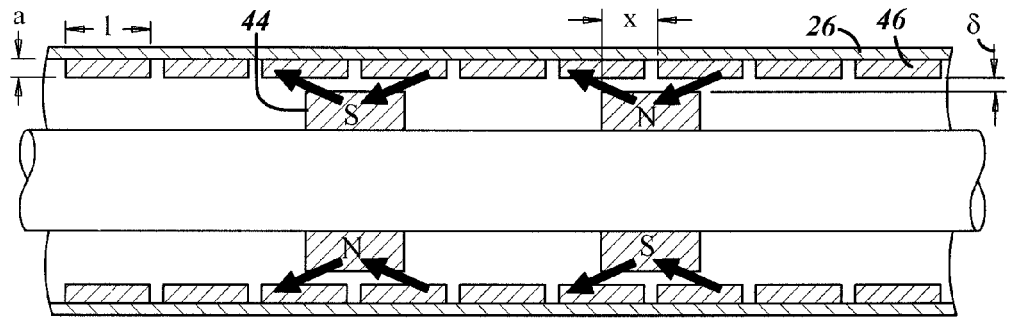
FIG. 4 is a schematic view of an electronic circuit for use with a steering system in accordance with an embodiment of the invention.

Referring now to FIG. 4, when the rack 24 moves toward a first (e.g., to the left in FIG. 4) side of a vehicle, a guidance force is generated between the first magnets 44 and the second magnets 46. During this guidance force, the driver may feel relief when the guidance force gives assistance to steering (i.e., power steering). When the rack moves 24 toward a second (e.g., to the right in FIG. 4) side of a vehicle, in which the second side opposes the first side, the sensor 48 may give a signal in the reverse direction to activate second magnet 46 (and/or first magnet 44). By changing the current direction through the second magnet 46 (and/or first magnet 44) and/or solenoid 62, guidance force may vary with vehicle speed and steering direction. During guidance force generated by the system 10, the driver of the motor vehicle may feel relief as the force required for steering the vehicle is lessened. Magnetic levitation and/or magnetic guidance force (i.e., "maglev") that may be utilized in the inventive steering system 10 is a method by which an object may be suspended with no support other than magnetic fields. The electromagnetic force may be used to counteract the effect of gravitational force.

Figure 5:
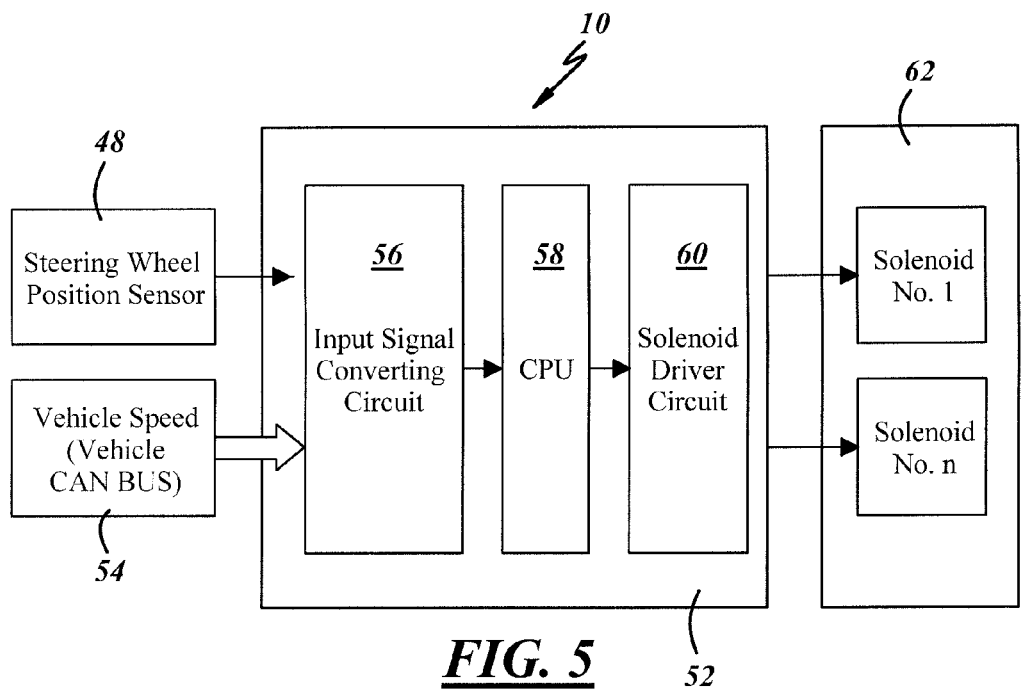
FIG. 5 is a schematic view of an electronic circuit for use with a steering system in accordance with an embodiment of the invention.

Referring now to FIG. 5, which illustrates a schematic view of an electronic circuit for use with a steering system 10 in accordance with an embodiment of the invention, the steering system 10 has an ECU 52 that may interface with a steering position sensor 48 and/or a vehicle speed sensor 54 (for example, but not limited to, a Vehicle CAN BUS). The ECU 52 may be configured to provide a calculated guidance force to assist an operator in maneuvering a motor vehicle based on the steering wheel position and vehicle speed. The electronic device (e.g., solenoid 62) may vary current flowing through the first magnet 44 and/or second magnet 46, (e.g., by varying pulse-width-modulation (PWM) duty cycle) in order to control the guidance force. The first magnet 44 and/or the second magnet 46 may comprise an electromagnet in accordance with an embodiment of the invention, and the electronic device may generally vary current flowing through the first magnet 44 and/or the second magnet 46 when the first and/or second magnet 44, 46 comprises an electromagnet. Although pulse-width-modulation is mentioned in detail, other methods of control may be used that are known to those of ordinary skill in the art. If any sensor (e.g., steering wheel position sensor 48 and/or vehicle speed sensor 54) and/or the ECU 52 itself fails, the steering system 10 may be configured to operate completely on the mechanical system, and there may be no guiding force available when the ECU 52 fails. Still referring to FIG. 5, ECU 52 may comprise an input signal converting circuit 56. Input signal converting circuit 56 may be configured to read, receive, process, and/or convert signals received from steer sensor 48 and/or speed sensor 54. ECU 52 may further comprise a central processing unit (CPU) 58. The CPU 58 may comprise a memory unit that is non-volatile so that constants may be stored (e.g., not lost) when the ECU 52 is deenergized. The constants may comprise parameters for defining the various equations for duty cycle variation based on speed and steering position in an embodiment in which pulse-width-modulation may be used to control the guidance force. The ECU 52 may further comprise a solenoid driver circuit 60. Solenoid driver circuit 60 may be configured to drive and/or control current flowing through a solenoid 62. Solenoid 62 may comprise first magnet 44 assembled with a coil 47 disposed around it and/or second magnet 46 assembled with a coil 47 disposed around it as previously described herein. Current may flow through the coil 47, thereby generating an electromagnetic field force. The electromagnetic field force may assist the steering force in accordance with an embodiment of the invention.

Figure 6:
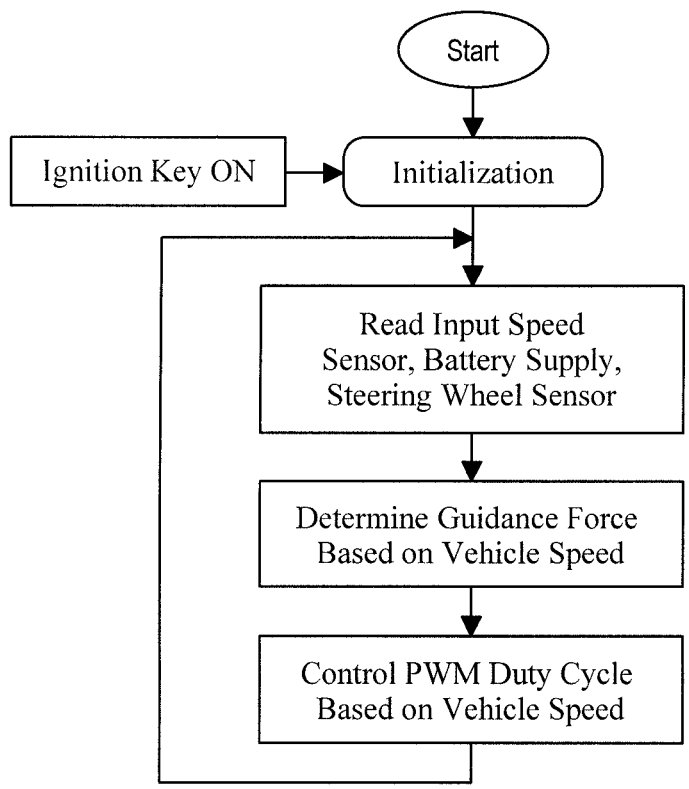
FIG. 6 is a flow diagram for a steering system in accordance with an embodiment of the invention.

Referring now to FIG. 6, a flow diagram for a steering system 10 in accordance with an embodiment of the invention that utilizes pulse-width-modulation to control guidance force illustrates the control logic flow between percentage duty cycle and guidance force based on vehicle speed. Information regarding vehicle speed may be obtained through utilization of speed sensor 54, for example. In particular, the first step may be initialization after the ignition key is turned on, for example. The input from the speed sensor 54, from the battery supply (not shown), and from steering wheel sensor 48 may then be read by the ECU 52. The ECU 52 may next determine the guidance force based on vehicle speed. The ECU 52 may then control PWM duty cycle based on vehicle speed in an embodiment of the steering system 10. Guidance force (e.g., controlled by the PWM duty cycle in an embodiment) may generally be greater when vehicle speed is lower. In other words, the lower the vehicle speed, the greater the provided assistance (i.e., greater duty cycle in an embodiment) when the motor vehicle steers. Accordingly, the ECU 52 may provide more guidance force to the driver in maneuvering the vehicle. The maximum low speed guidance force (e.g., controlled by the PWM duty cycle in an embodiment) may be adjusted to about 95% duty cycle in an embodiment of the invention. When the vehicle is at a high speed, the guidance force applied for the assist may be less (i.e., lesser duty cycle in an embodiment). For example and without limitation, at about 45 mph to about 30 mph, the duty cycle may be adjusted to about 30% duty cycle in an embodiment.

Although the above referenced values for pulse-width-modulation control are mentioned in detail and may comprise a default guidance force setting for a system 10 that utilizes pulse-width-modulation control in an embodiment, the duty cycle for the guidance force may be greater or lower in other embodiments. In addition, the guidance force at various vehicle speeds may be adjustable through the speed sensor 54 interface (e.g., the Vehicle CAN BUS interface or a separate speed sensor). In particular, the guidance force at various vehicle speeds may be adjusted depending on the drivability requirements for system 10.

Figure 7:
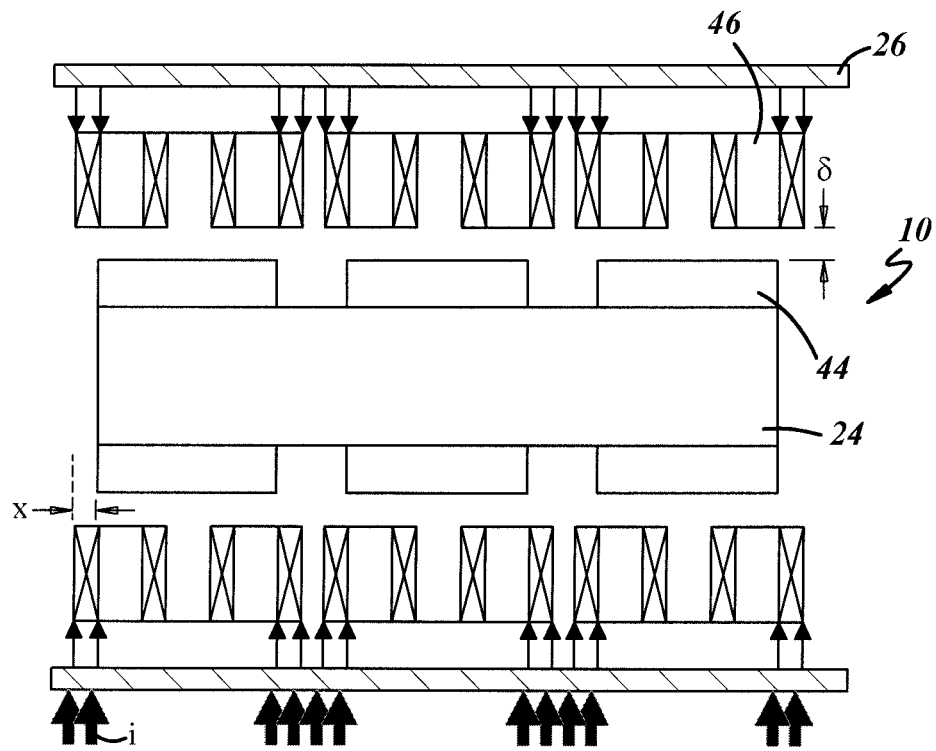
FIG. 7 is a schematic view of a portion of the magnetic assisted power steering system viewed inside of the rack tube in accordance with an embodiment of the invention.

Generally, for the calculation of guidance force, complete leakage fluxes and/or wide fringe fluxes may be taken into account. However, a simpler magnetic model may be used in order to simplify the calculations of static forces and the dynamic simulations. For example, in accordance with a simpler magnetic model, the magnetic potential losses in the iron parts (e.g., electromagnetic core and rack) and the leakage fluxes may be neglected. Further, the magnetic flux flows in the airgaps (e.g., between first magnets 44 and second magnets 46) and the leakage fluxes may be assumed. Further, it may be assumed that the magnetic flux flows in the airgaps in a constant section, for any value of δ and x as described below and as generally depicted in FIG. 7. FIG. 7 is a schematic view of a portion of the magnetic assisted power steering system 10 viewed inside of the rack tube 26 in accordance with an embodiment of the invention. The levitation force $f_{LEV}$ and guidance force $f_{GUID}$ for steering system 10 may generally be calculated in accordance with the following equations, wherein i=current flowing in the coil of the solenoid comprising second magnet 46; δ=the air gap between the first magnets 44 and second magnets 46; x=the lateral position of second magnets 46 (i.e., the position of second magnet 46 relative to first magnet 44 in the direction of the longitudinal axis A of the rack 24).

$$f_{LEV}(i, \delta, x) = \frac{1}{2}\left[\frac{\partial}{\partial \delta}L(\delta, x)\right]i^2 \quad \text{(Equation 1)}$$

$$f_{GUID}(i, \delta, x) = \frac{1}{2}\left[\frac{\partial}{\partial \delta}L(\delta, x)\right]i^2 \quad \text{(Equation 2)}$$

In accordance with an embodiment of the magnetic assisted power steering system 10, the levitation force $f_{LEV}$ and guide force $f_{GUID}$ for the steering system 10 may also generally be calculated in accordance with the following equations. In the equations below, x=the lateral position of second magnet 46 (i.e., the position of second magnet 46 relative to first magnet 44 in the direction of the longitudinal axis A of the rack 24); δ=the air gap between the first magnets 44 and the second magnets 46; i=current flowing in the coil and/or solenoid comprising second magnet 46; N=the number of turns in the coil 47 assembled around second magnet 46; $\mu_o$=permeability of free space; a=width of the second magnet 46; and l=length of the second magnet 46.

$$f_{LEV}(x, \delta, i) = \frac{1}{4}N^2\mu_0\left[-\frac{(a-x)}{\delta^2} - \frac{4x}{4\delta^2 + \pi\delta x}\right]li^2 \quad \text{(Equation 3)}$$

$$f_{GUID}(x, \delta, i) = \frac{1}{4}N^2\mu_0\left[-\frac{1}{\delta} + \frac{4}{4\delta + \pi x}\right]li^2 \quad \text{(Equation 4)}$$

Figure 8:
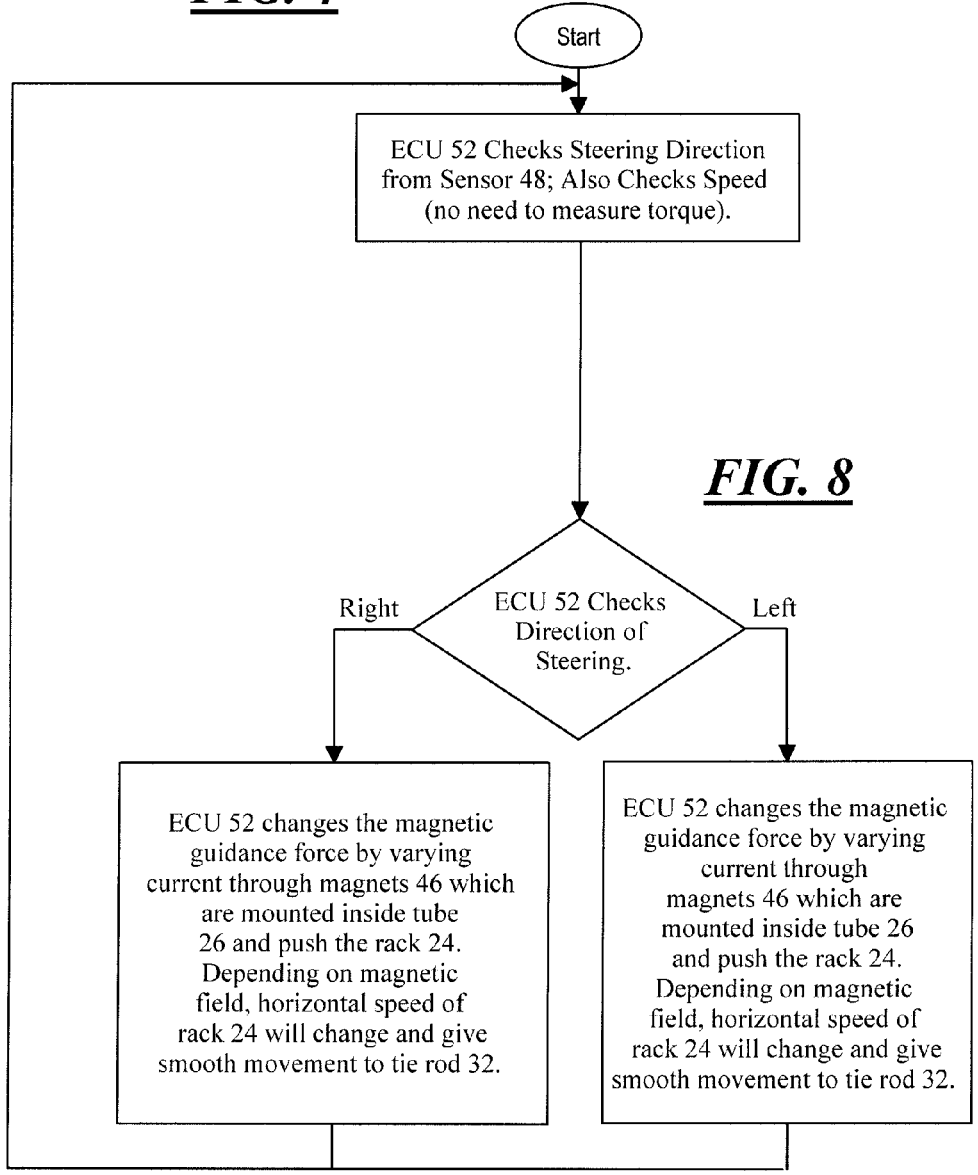
FIG. 8 is a flow diagram for a steering system in accordance with an embodiment of the invention.

Referring now to FIG. 8, another flow diagram for a steering system 10 in accordance with an embodiment of the invention is generally illustrated. As generally illustrated, as a first step, ECU 52 may check (e.g., may read) steering direction and/or steering information from steer sensor 48 and may check vehicle speed from the vehicle CAN-bus 54 or a speed sensor. For example and without limitation, if the vehicle speed is less than and/or equal to about 20 km/hr, then no magnetic levitation assistance may be provided in an embodiment of the invention if the motor vehicle is in a straight driving condition. Instead, the steering operation may only be based on movement and/or motion of the rack 24 and pinion 22 in an embodiment of the invention. Otherwise, the ECU may check (e.g., may read) steering direction and/or steering information from steer sensor 48 and/or may use previously checked data regarding steering speed from the vehicle CAN-bus 54 or steer sensor 48. If the steer sensor 48 indicates that the steering direction is toward the right (e.g., clockwise), the ECU 52 may change the direction of current flow through the second magnets 46 which may be mounted inside rack housing or rack tube 26, thereby pushing the rack 24. Depending on the magnetic field (e.g., generated by solenoid 62), the horizontal speed of the rack 24 may be changed and may give smooth movement to the tie rod 32. If the steer sensor 48 indicates that the steering direction is toward the left (e.g., counter-clockwise), the ECU 52 may change the direction of current flow through the second magnets 46 which may be mounted inside rack housing or rack tube 26, thereby pushing the rack 24. Depending on the magnetic field (e.g., generated by solenoid 62), the horizontal speed of the rack 24 may be changed and may give smooth movement to the tie rod 32. Although, for example, about 20 km/hr is mentioned as a transition point between mechanical steering and magnetic power assist steering in an embodiment of the invention, this transition point may be lower or higher in other embodiments of the invention.

The foregoing descriptions of specific embodiments of the present invention have been presented for purposes of illustration and description. They are not intended to be exhaustive or to limit the invention to the precise forms disclosed, and various modifications in electronic, mechanical, and material specifications are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A power steering system for a motor vehicle, comprising:
   a steering shaft;
   a pinion shaft connected to the steering shaft;
   a pinion located on the pinion shaft, the pinion having at least one pinion tooth;
   a rack having at least one rack tooth configured engage with the pinion tooth;
   a rack housing surrounding the rack;
   a first magnet connected to the rack; and
   a second magnet connected to the rack housing, wherein the system is configured to control the magnetization or activation/deactivation of the first magnet, the second magnet, or both the first magnet and second magnet.

2. The power steering system of claim 1, wherein the rack is configured for linear movement transverse to a longitudinal axis of the motor vehicle.

3. The power steering system of claim 1, wherein a first end of the rack is connected to a first tie rod, and a second end of the rack is connected to a second tie rod, and wherein the first and second tie rods are connected to wheels of the motor vehicle.

4. The power steering system of claim 1, wherein the first magnet is connected to an outer surface of the rack.

5. The power steering system of claim 1, wherein the first magnet comprises a permanent magnet.

6. The power steering system of claim 1, wherein the first magnet comprises an electromagnet.

7. The power steering system of claim 1, wherein the second magnet is connected to an inner surface of the rack housing.

8. The power steering system of claim 1, wherein the second magnet comprises an electromagnet.

9. The power steering system of claim 1, wherein the second magnet comprises a permanent magnet.

10. The power steering system of claim 1, wherein the first magnet is directly connected to the rack.

11. The power steering system of claim 1, wherein the second magnet is directly connected to the rack housing.

12. The power steering system of claim 1, wherein the first and second magnets are separated by an air gap in a radial direction of the rack.

13. The power steering system of claim 1, further comprising a slide block disposed at an end of the rack.

14. The power steering system of claim 1, further comprising a steering position sensor configured to sense steering information for the motor vehicle.

15. A power steering system for a motor vehicle, comprising:
   a steering shaft;
   a pinion shaft connected to the steering shaft;
   a pinion located on the pinion shaft, the pinion having at least one pinion tooth;
   a rack having at least one rack tooth configured engage with the pinion tooth;
   a rack housing surrounding the rack;
   a first magnet connected to the rack;
   a second magnet connected to the rack housing;
   a steering position sensor configured to sense steering information for the motor vehicle; and
   an electronic control unit configured to:
   (i) obtain the steering information from the steering position sensor; and
   (ii) control the activation of the first or second magnet in response to the steering information.

16. The power steering system of claim 15, wherein the electronic control unit is further configured to:
   (i) obtain information regarding the speed of the motor vehicle from a vehicle CAN-bus or from a speed sensor; and
   (ii) control the activation of the first or second magnet in response to the speed of the motor vehicle.

17. The power steering system of claim 16, wherein the activation of the first or second magnet generates a magnetic levitation force in the direction of steering.

18. The power steering system of claim 16, wherein the first magnet or second magnet is controlled through pulse width modulation (PWM) duty cycle, and wherein the PWM duty cycle is inversely related to vehicle speed.

19. A method for providing steering assist in a power steering system of a motor vehicle, comprising:
   sensing steering position information;
   sensing vehicle speed information;
   controlling activation of least one magnet connected to the power steering system based at least in part on the steering position information or vehicle speed information or a combination thereof;
   assigning a polarity of the least one magnet connected to the power steering system; and
   generating a magnetic guidance force in the direction of steering.

20. An assembly for a power steering system for a motor vehicle, comprising:
   a rack;
   a rack housing surrounding the rack;
   a first magnet connected to the rack; and
   a second magnet connected to the rack housing;
   wherein the first magnet and the second magnet are configured such that, with application of current, an electromagnetic field force is generated to at least partially provide assistance for a steering force.

21. A power steering system for a motor vehicle, comprising:
   a first steering element;
   a first magnet connected to the first steering element;
   a second steering element;
   a second magnet connected to the second steering element; and
   a controller configured to obtain motor vehicle speed information and steering position information and to control the activation of the first magnet or second magnet in response to the motor vehicle speed information and the steering position information.

22. A power steering system for a motor vehicle, comprising:
   a steering shaft;
   a pinion shaft connected to the steering shaft;
   a pinion located on the pinion shaft, the pinion having at least one pinion tooth;
   a rack having at least one rack tooth configured engage with the pinion tooth;
   a rack housing surrounding the rack;
   a plurality of first magnets connected to the rack; and
   a plurality of second magnets connected to the rack housing.

23. The power steering system of claim 22, wherein the first magnets and the second magnets are alternating.

* * * * *

UNITED STATES PATENT AND TRADEMARK OFFICE
CERTIFICATE OF CORRECTION

| | | |
|---|---|---|
| PATENT NO. | : 8,457,842 B2 | Page 1 of 1 |
| APPLICATION NO. | : 12/643564 | |
| DATED | : June 4, 2013 | |
| INVENTOR(S) | : Kulkarni et al. | |

It is certified that error appears in the above-identified patent and that said Letters Patent is hereby corrected as shown below:

On the Title page, under (75) Inventors, "Girish Suchir Kulkarni" should be --Girish Sudhir Kulkarni--

Signed and Sealed this
Twenty-fifth Day of February, 2014

Michelle K. Lee
*Deputy Director of the United States Patent and Trademark Office*